United States Patent
Tsai et al.

(10) Patent No.: US 9,970,154 B1
(45) Date of Patent: May 15, 2018

(54) APPARATUS, METHOD, AND NON-TRANSITORY COMPUTER READABLE MEDIUM THEREOF FOR DECIDING A TARGET CONTROL DATA SET OF A FABRIC DYEING PROCESS

(71) Applicant: Institute For Information Industry, Taipei (TW)

(72) Inventors: Kun-Cheng Tsai, Taipei (TW); I-Hsuan Hong, New Taipei (TW); Argon Chen, New Taipei (TW)

(73) Assignee: Institute For Information Industry, Taipei (TW)

( * ) Notice: Subject to any disclaimer, the term of this patent is extended or adjusted under 35 U.S.C. 154(b) by 0 days. days.

(21) Appl. No.: 15/367,830

(22) Filed: Dec. 2, 2016

(30) Foreign Application Priority Data

Nov. 17, 2016 (TW) .............................. 105137607 A (51) Int. Cl.
*G06F 19/00* (2018.01)
*D06P 1/00* (2006.01)
*G05B 13/04* (2006.01)

(52) U.S. Cl.
CPC .......... *D06P 1/0032* (2013.01); *G05B 13/041* (2013.01)

(58) Field of Classification Search
CPC ..... D06P 1/0032; G05B 13/04; G05B 13/041; G05B 13/042

USPC .......................................................... 700/133
See application file for complete search history.

(56) References Cited

U.S. PATENT DOCUMENTS

| 5,846,265 A | 12/1998 | McGregor et al. | |
|---|---|---|---|
| 6,792,329 B2 * | 9/2004 | Adams, Jr. ............. | G06K 15/02 345/604 |
| 7,394,555 B2 * | 7/2008 | Cox ........................ | B41J 3/4078 347/20 |
| 8,082,057 B2 * | 12/2011 | Allen .................. | D06B 11/0056 700/130 |
| 2003/0060918 A1 * | 3/2003 | West .................. | D06B 11/0059 700/133 |

* cited by examiner

*Primary Examiner* — Nathan Durham
(74) *Attorney, Agent, or Firm* — Skaar Ulbrich Macari, P.A.

(57) ABSTRACT

An apparatus, method, and non-transitory computer readable medium thereof for deciding a target control data set of a fabric dyeing process are provided. The apparatus decides a plurality of determination factors of a dyeing quality-related model according to a plurality of control factors corresponding to a plurality of historical control data set and calculates a coefficient corresponding to each of the determination factors. The apparatus further calculates the target control data set that minimizes a dyeing target-related model according to a control condition set, wherein the control condition set includes a predetermined range of the dyeing quality-related model and a predetermined range of each control factor.

20 Claims, 3 Drawing Sheets

FIG. 1A

|  | A | B | C | D | E | ΔE | K/S |
|---|---|---|---|---|---|---|---|
| 10a | 65 | 1.31 | 85 | 12 | 25 | 1.00 | 96 |
| 10b | 51 | 1.78 | 77 | 40 | 10 | 0.34 | 103 |
|  | ⋮ | ⋮ | ⋮ | ⋮ | ⋮ | ⋮ | ⋮ |
| 10c | 40 | 1.72 | 85 | 12 | 15 | 0.79 | 98 |

Columns A–E: Historical control data; Columns ΔE, K/S: Historical dyeing quality data

APPARATUS, METHOD, AND NON-TRANSITORY COMPUTER READABLE MEDIUM THEREOF FOR DECIDING A TARGET CONTROL DATA SET OF A FABRIC DYEING PROCESS

PRIORITY

This application claims priority to Taiwan Patent Application No. 105137607 filed on Nov. 17, 2016, which is hereby incorporated by reference in its entirety.

FIELD

The present invention relates to an apparatus, a method, and a non-transitory computer readable medium thereof for deciding a target control data set of a fabric dyeing process. More particularly, the present invention relates to an apparatus, a method, and a non-transitory computer readable medium thereof that decide a target control data set of a fabric dyeing process according to a plurality of related models.

BACKGROUND

The fabric dying technology decides a dye formula (e.g., proportions of a red dye, a yellow dye, and a blue dye) and a control data set of a plurality of control factors (e.g., starting temperature of the dominant dyeing process, temperature rise rate of the dominant dyeing process, endpoint temperature of the dominant dyeing process, the duration in which the dominant dyeing process maintains the maximum temperature, and bath ratio) for a fabric dyeing process in three stages. Briefly speaking, in the first stage, the user makes a test on a sample in the laboratory to preliminarily decide the dye formula and the control data set of a plurality of control factors for the fabric dyeing process. In the second stage, the dye formula and the control data set decided in the first state is applied in a dyeing vat of the factory. In the third stage, the dyeing result of the second stage is inspected (e.g., analyzing the consistency between the color of the finished product and the ordered color through use of a spectrometer). If the dyeing result fails to meet the expectation, the three stages have to be repeated until the dye formula and the control data set decided lead to the expected dyeing result. Since the dyeing production scale of the factory is much greater than that of the dyeing test in the laboratory (e.g., the cloth to be dyed in the dyeing vat of the factory may be tens of thousands or even hundreds of thousands of times of the sample used in the laboratory), repeating the aforementioned three stages will remarkably increase the cost of the fabric dyeing process.

Based on the above descriptions, whether the dye formula and the control data set decided in the laboratory in the first stage is able to meet the real requirement is critical. Currently, the dye formula for a fabric dyeing process can be decided by the well-established dye formula software (e.g., Datacolor MATCH) and, therefore, the dye formula does not have to be adjusted repeatedly. As to the control data set of control factors of the fabric dyeing process, it is decided by the manufacturer by experience. Deciding the control data set based on user's experience is inefficient. In addition, in case that a decided control data set is not good enough, the aforesaid three stages have to be repeated and a remarkable increase in the cost of the fabric dyeing process will be caused.

Accordingly, efforts have to be made in the art to efficiently and accurately decide a target control data set for a fabric dyeing process so as to meet the requirement of dyeing quality, increase the stability and reduce the production cost.

SUMMARY

The disclosure includes an apparatus, a method, and a non-transitory computer readable medium thereof for deciding a target control data set of a fabric dyeing process.

The apparatus for deciding a target control data set of a fabric dyeing process according to the present invention can comprise a storage and a processor, wherein the storage and the processor are electrically connected with each other. The target control data set comprises a plurality of control data, wherein the plurality of control data correspond to a plurality of control factors one-on-one. The storage is configured to store a plurality of historical control data sets, wherein each of the historical control data sets comprises a historical dyeing quality datum and a plurality of historical control data corresponding to the control factors one-on-one. The processor is configured to decide a dyeing quality-related model of the fabric dyeing process. Specifically, the processor executes the following operations to decide the dyeing quality-related model: (a1) deciding a plurality of determination factors of the dyeing quality-related model according to the control factors and (a2) calculating a coefficient of each of the determination factors of the dyeing quality-related model according to the historical control data sets of the fabric dyeing process. The processor is further configured to calculate the target control data set that minimizes a dyeing target-related model according to a control condition set. The dying target-related model is defined by the control factors. The control condition set comprises a predetermined range of the dyeing quality-related model and a predetermined range of each of the control factors.

The method for deciding a target control data set of a fabric dyeing process according to the present invention is adapted for an electronic computing apparatus. The target control data set can comprise a plurality of control data, wherein the plurality of control data correspond to a plurality of control factors one-on-one. The method comprises the following steps of: (a) deciding a dyeing quality-related model of the fabric dyeing process and (b) calculating the target control data set that minimizes a dyeing target-related model according to a control condition set. Specifically, the step (a) comprises the following steps of: (a1) deciding a plurality of determination factors of the dyeing quality-related model according to the control factors and (a2) calculating a coefficient of each of the determination factors of the dyeing quality-related model according to a plurality of historical control data sets of the fabric dyeing process. Each of the historical control data sets comprises a historical dyeing quality datum and a plurality of historical control data, wherein the historical control data correspond to the control factors one-on-one. The dying target-related model in the step (b) is defined by the control factors. The control condition set comprises a predetermined range of the dyeing quality-related model and a predetermined range of each of the control factors.

The non-transitory computer readable medium according to the present invention has a computer program stored therein. The computer program can execute a method for deciding a target control data set of a fabric dyeing process after being loaded into an electronic computing apparatus. The target control data set comprises a plurality of control data, wherein the plurality of control data correspond to a plurality of control factors one-on-one. The method comprises the following steps of: (a) deciding a dyeing quality-related model of the fabric dyeing process and (b) calculating the target control data set that minimizes a dyeing target-related model according to a control condition set. Specifically, the step (a) comprises the following steps of: (a1) deciding a plurality of determination factors of the dyeing quality-related model according to the control factors and (a2) calculating a coefficient of each of the determination factors of the dyeing quality-related model according to a plurality of historical control data sets of the fabric dyeing process. Each of the historical control data sets comprises a historical dyeing quality datum and a plurality of historical control data corresponding to the control factors one-on-one. The dying target-related model in the step (b) is defined by the control factors. The control condition set comprises a predetermined range of the dyeing quality-related model and a predetermined range of each of the control factors.

Briefly speaking, the technology provided by the present invention utilizes a plurality of historical control data sets to decide at least one dyeing quality-related model and then calculates a target control data set that satisfies a control condition set (comprising a predetermined range of the dyeing quality-related model and a predetermined range of each of a plurality of control factors) and minimizes a dyeing target-related model. Both the at least one dyeing quality-related model and the dyeing target-related model used in deciding the target control data set are related to a plurality of control factors of a fabric dyeing process. Since the control factors that affect the fabric dyeing process are taken into consideration and the historical control data sets are utilized, the technology provided by the present invention can efficiently calculate the target control data of the fabric dyeing process and avoid the cost waste that is caused when a manufacturer decides the target control data set by experience.

The detailed technology and preferred embodiments implemented for the subject invention are described in the following paragraphs accompanying the appended drawings for people skilled in this field to well appreciate the features of the claimed invention.

DETAILED DESCRIPTION

In the following description, an apparatus, a method, and a non-transitory computer readable medium thereof for deciding a target control data set of a fabric dyeing process according to the present invention will be explained with reference to certain example embodiments thereof. However, these example embodiments are not intended to limit the present invention to any specific example, embodiment, environment, applications, or implementations described in these example embodiments. Therefore, description of these example embodiments is only for purpose of illustration rather than to limit the present invention. It shall be appreciated that, in the following embodiments and the attached drawings, elements unrelated to the present invention are omitted from depiction. In addition, dimensional relationships among individual elements in the attached drawings are illustrated only for ease of understanding but not to limit the actual scale.

Figure 1A:
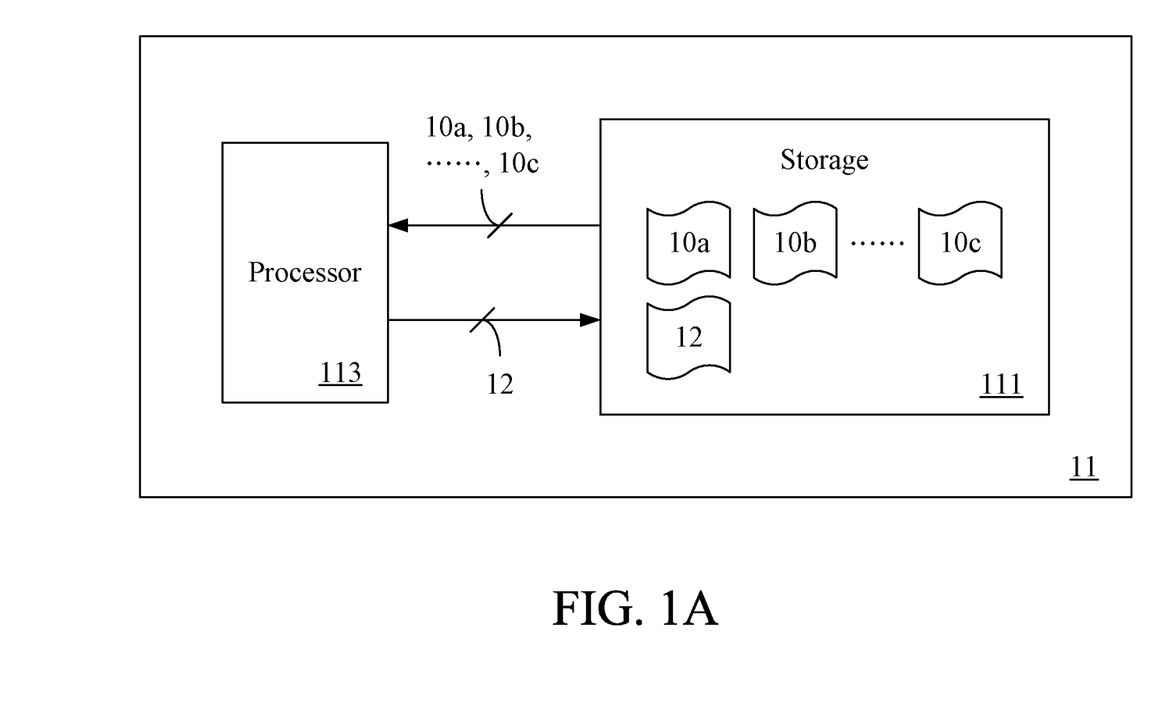
FIG. 1A illustrates a schematic view of the control data decision apparatus 11 of the first embodiment.

A first embodiment of the present invention is an apparatus 11 for deciding a target control data set (hereinafter referred to as "control data decision apparatus") of a fabric dyeing process and a schematic view of which is depicted in FIG. 1A. The control data decision apparatus 11 comprises a storage 111 and a processor 113, wherein the storage 111 and the processor 113 are electrically connected with each other. The storage 111 may be a memory, a universal serial bus (USB) disk, a hard disk, a compact disk (CD), a mobile disk, or some other storage medium or circuit with the same function and well known to a person of ordinary skill in the art. The processor 113 may be any of various processing units, central processing units (CPUs), microprocessors, or other computing devices well known to a person of ordinary skill in the art.

In the fabric dyeing technology, different combinations of fabric materials (e.g., polyester fibers, nylon, and blended fabric), fiber sizes (e.g., smaller or greater than 75 Denier), dye categories (e.g., leveling dye or metal complex) and total concentration ranges (e.g., lower than 0.5%, between 0.5% and 1.5%, and greater than 1.5%) require different fabric dyeing processes. The control data decision apparatus 11 is able to decide different target control data sets for different fabric dyeing processes. The control data decision apparatus 11 decides target control data sets for different fabric dyeing processes by the same approach and, hence, the following descriptions will be focused on the details for one single fabric dyeing process.

The dyeing result (e.g., dyeing quality, stability, and production cost) of a fabric dyeing process is affected by a plurality of control factors (e.g., dye concentration, additive concentration, pH value, bath ratio, starting temperature of the dominant dyeing process, temperature rise rate of the dominant dyeing process, endpoint temperature of the dominant dyeing process, duration of the maximum temperature of the dominant dyeing process, and washing time, etc.). What the control data decision apparatus 11 decides is the control data of the control factors for a fabric dying process, wherein the set formed by these control data is the target control data set. In other words, the target control data set decided by the control data decision apparatus 11 comprises a plurality of control data, wherein these control data correspond to the control factors one-on-one. It shall be noted that the dominant dyeing process is a process interval in which the dyeing result is affected by the control factors significantly. The conventional fabric dyeing process usually divides the temperature rising process into three intervals, including the first interval from the room temperature to the starting temperature of the dominant dyeing process, the second interval from the starting temperature of the dominant dyeing process to the endpoint temperature of the dominant dyeing process, and the third interval from the endpoint temperature of the dominant dyeing process to the maximum temperature of the dominant dyeing process. Comparing to the first interval and/or the third interval, the control factors affect the dyeing result more significantly in the second interval and, hence, the second interval is considered as a risk interval for the fabric dyeing process. Therefore, a person of ordinary skill in the art should be able to appreciate that one may adopt information related to the dominant dyeing process (i.e., the second interval) as the control factors.

The storage 111 of the control data decision apparatus 11 is stored with a plurality of historical control data sets 10a, 10b, 10c of the fabric dyeing process, wherein each of the historical control data sets 10a, 10b, 10c comprises at least one historical dyeing quality datum and a plurality of historical control data corresponding to the control factors one-on-one. Specifically, each of the historical control data sets 10a, 10b, 10c comprises the control data of each of the control factors previously used in the fabric dyeing process and the dyeing quality data of the resultant dyed products.

Figure 1B:
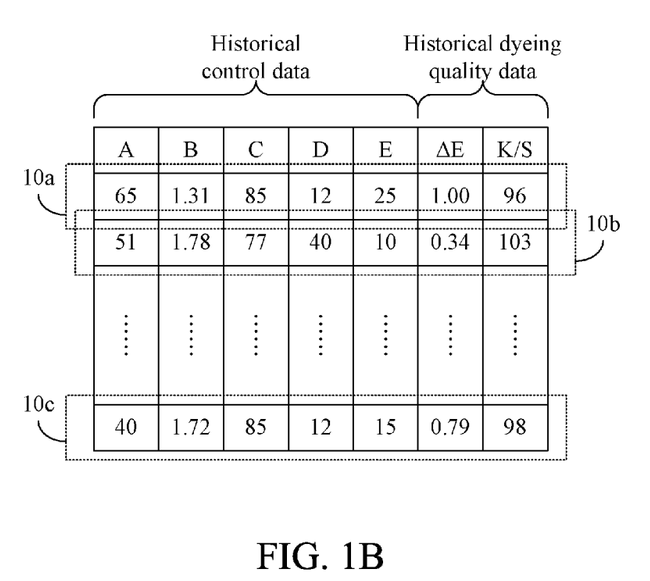
FIG. 1B illustrates an example of the historical control data sets 10a, 10b, . . . , 10c.

For ease of understanding, please refer to a specific example depicted in FIG. 1B. In this example, the fabric dyeing process has five control factors A, B, C, D, E and two dyeing quality-related standards K/S and ΔE. For example, the control factors A, B, C, D, E may be a starting temperature of the dominant dyeing process, a temperature rise rate of the dominant dyeing process, an endpoint temperature of the dominant dyeing process, the duration in which the dominant dyeing process maintains the maximum temperature, and a bath ratio of the fabric dyeing process respectively. The dyeing quality standard K/S may be a color fastness standard, while the dyeing quality standard ΔE may be the delta E in the CIE76 standard formulated by the International Commission on Illumination (CIE). In this specific example, each of the historical control data sets 10a, 10b, 10c comprises five historical control data corresponding to the control factors A, B, C, D, E one-on-one and two historical dyeing quality data corresponding to the dyeing quality standards K/S and ΔE one-on-one. It shall be noted that the number of control factors, the number of dyeing quality standards, the specific forms of the control factor, and the specific forms of the dyeing quality standards provided herein are only for illustration rather than limiting the scope of the present invention.

Next, how the control data decision apparatus 11 decides a target control data set for a fabric dyeing process will be described. In this embodiment, the control data decision apparatus 11 decides the target control data set by the historical control data sets 10a, 10b, 10c, at least one dyeing quality-related model, and a dyeing target-related model.

First, the processor 113 of the control data decision apparatus 11 decides at least one dyeing quality-related model of the fabric dyeing process with the purpose of establishing the relations between the control factors and the dyeing quality. In this embodiment, two dyeing quality-related models are decided by the processor 113, namely, a first dyeing quality-related model and a second dyeing quality-related model. It shall be noted that the processor 113 may decide a different number of dyeing quality-related model. In other words, the present invention does not limit the number of dyeing quality-related models decided by the control data decision apparatus 11 to two.

Specifically, the processor 113 decides a plurality of first determination factors of the first dyeing quality-related model according to the control factors. Then, the processor 113 calculates a first coefficient of each of the first determination factors of the first dyeing quality-related model according to the historical control data sets 10a, 10b, . . . , 10c of the fabric dyeing process. As described above, the dyeing result of a fabric dyeing process is affected by a plurality of control factors. Further, these control factors may interact with each other to further affect the dyeing result. Therefore, the processor 113 decides the first determination factors of the first dyeing quality-related model according to the control factors, wherein the first determination factors may be considered as the factors that may affect the dyeing result of the fabric dyeing process. For ease of understanding, the following description will refer to the specific example depicted in FIG. 1B. The processor 113 may decide a plurality of first determination factors by taking the control factors A, B, C, D, E and interactions between any two of the control factors into consideration. Please refer to Equation (1) below:

$$f_{K/S}(A,B,C,D,E)=b+b_A A+b_B B+ \ldots +b_E E+b_{AB} AB+ b_{AC} AC+ \ldots +b_{AA} A^2+ \ldots \quad (1)$$

In Equation (1), $f_{K/S}$ (A, B, C, D, E) represents the first dyeing quality-related model, variables A, B, E represent the control factors A, B, C, D, E respectively, and the first determination factors decided by the processor 113 include the variables A, B, E, AB, AC, . . . , $A^2$, . . . and so on. It shall be noted that, in Equation (1), the processor 113 only takes the effect caused by individual control factors and interactions between any two of the control factors into consideration. Nevertheless, in other embodiments, the processor 113 may further take interactions between other numbers of control factors (i.e., between any three or any four of the control factors) into consideration.

After the first determination factors have been decided by the processor 113, the processor 113 calculates a first coefficient of each of the first determination factors of the first dyeing quality-related model according to the historical dyeing quality data corresponding to the dyeing quality standard K/S and the historical data corresponding to the control factors A, B, E in each of the historical control data sets 10a, 10b, . . . , 10c. Each of the first coefficients reflects the contribution of the corresponding first determination factor in the first dyeing quality-related model. Taking Equation (1) as an example, the variables b, $b_A$, $b_B$, $b_E$, $b_{AB}$, $b_{AC}$, . . . , $b_{AA}$, . . . represent the first coefficients to be calculated by the processor 113. Once the first coefficients are calculated by the processor 113, the first dyeing quality-related model is decided. Since the historical dyeing quality data corresponding to the dyeing quality standard K/S in the historical control data sets 10a, 10b, 10c are used when the processor 113 decides the first dyeing quality-related model, it is considered that the first dyeing quality-related model is related to the color fastness standard.

It shall be noted that, in some embodiments, the processor 113 may calculate the first coefficients according to a statistical algorithm, a back-propagation neural network (BPN) algorithm, or a support vector regression (SVR) algorithm. The statistical algorithm may comprise a multiple linear regression algorithm and a plurality of relative weights. A person of ordinary skill in the art should have the knowledge of how to calculate the first coefficients in Equation (1) according to a statistical algorithm, a BPN algorithm, or a SVR algorithm can be understood by those of ordinary skill in the art, so the details are not described herein.

Similarly, the processor 113 decides a plurality of second determination factors of the second dyeing quality-related model according to the control factors. Then, the processor 113 calculates a second coefficient of each of the second determination factors of the second dyeing quality-related model according to the historical control data sets 10a, 10b, 10c of the fabric dyeing process. The second determination factors may be considered as the factors that may affect the dyeing result of the fabric dyeing process and each of the second coefficients reflects the contribution of the corresponding second determination factor in the second dyeing quality-related model. Taking FIG. 1B as an example, the processor 113 may decide a plurality of second determination factors by taking the control factors A, B, C, D, E and interactions between any two of the control factors into consideration. Please refer to Equation (2) below:

$$f_{\Delta E}(A,B,C,D,E) = a + a_A A + a_B B + \ldots + a_E E + a_{AB} AB + a_{AC} AC + \ldots + a_{AA} A^2 + \ldots \quad (2)$$

In Equation (2), $f_{\Delta E}$ (A, B, C, D, E) represents the second dyeing quality-related model, variables A, B, E represent the control factors A, B, C, D, E respectively, and the second determination factors decided by the processor 113 include the variables A, B, E, AB, AC, ..., $A^2$, ... and so on. Similarly, in Equation (2), the processor 113 only takes the effect caused by individual control factors and interactions between any two of the control factors into consideration. However, in other embodiments, the processor 113 may further take interactions between other numbers of control factors (i.e., between any three or any four of the control factors) into consideration.

After the second determination factors have been decided by the processor 113, the processor 113 calculates a second coefficient of each of the second determination factors of the second dyeing quality-related model according to the historical dyeing quality data corresponding to the dyeing quality standard ΔE and the historical data corresponding to the control factors A, B, E in each of the historical control data sets 10a, 10b, 10c. Taking Equation (2) as an example, the variables a, $a_A$, $a_B$, $a_E$, $a_{AB}$, $a_{AC}$, $a_{AA}$, ... represent the second coefficients to be calculated by the processor 113. Once the second coefficients are calculated by the processor 113, the second dyeing quality-related model is decided. Since the historical dyeing quality data corresponding to the dyeing quality standard ΔE in the historical control data sets 10a, 10b, 10c are used when the processor 113 decides the second dyeing quality-related model, it is considered that the second dyeing quality-related model is related to the delta E in the CIE76 standard.

Likewise, in some embodiments, the processor 113 may calculate the second coefficients according to a statistical algorithm, a back-propagation neural network (BPN) algorithm, or a support vector regression (SVR) algorithm. The statistical algorithm may comprise a multiple linear regression algorithm and a plurality of relative weights.

Next, the details regarding how the processor 113 calculates the target control data set 12 that minimizes a dyeing target-related model according to a control condition set is given.

The control data decision apparatus 11 of this embodiment provides three different dyeing target-related models, wherein the first dyeing target-related model is related to a dyeing quality standard, the second dyeing target-related model is related to the dyeing stability, and the third dyeing target-related model is related to the dyeing cost. The first, the second, and the third dyeing target-related models are all defined by the control factors (i.e., associated with the control factors). The first, the second, and the third dyeing target-related models may be stored in the storage 111 in advance. It shall be noted that the control data decision apparatus 11 may provide a different number of dyeing target-related models in other embodiments; that is, the present invention does not limit the number of the dyeing target-related model provided by the control data decision apparatus to three. Further, the dyeing target-related models provided by the control data decision apparatus 11 may be related to other targets that the user are interested in; that is, the present invention does not limit the dyeing target-related models to being related to the dyeing quality standard, the dyeing stability or the dyeing cost.

For ease of understanding, the description will be made with reference to the example depicted in FIG. 1B. As an example, the processor 113 may adopt the aforesaid Equation (2) as the first dyeing target-related model, which means the first dyeing target-related model is related to the delta E in the CIE76 standard and the first dyeing target-related model is defined by the control factors A, B, C, D, E. As another example, the processor 113 may adopt the following Equation (3) as the second dyeing target-related model, wherein the second dyeing target-related model is defined by the control factors A, B, C, D, E. Since a gradient value of $f_{\Delta E}$ (A, B, C, D, E) is considered in the second dyeing target-related model, the second dyeing target-related model is related to the dyeing stability.

$$\text{Grediant of } [f_{\Delta E}(A,B,C,D,E)^2] \quad (3)$$

As another example, the processor 113 may adopt the following Equation (4) as the third dyeing target-related model, which takes the power consumption cost, the water consumption cost, and the machine utilization cost of the fabric dyeing process into consideration. The third dyeing target-related model is defined by the control factors A, B, C, D, E.

$$C_1 SM(T_H - T_L)E + (C_2 + C_3)MKE + C_4\left(\frac{(T_H - T_L)}{v} + \frac{(C-A)\cdot(v-B)}{B \cdot v} + D\right) \quad (4)$$

In Equation (4), the variable $C_1$ represents the cost per Joule, the variable S represents the thermal capacity, the variable M represents weight of the fabric product, the variable $T_L$ represents the indoor temperature, the variable $T_H$ represents the maximum temperature, the variable $C_2$ represents the cost per kilogram of water consumption, the variable $C_3$ represents the processing cost per kilogram of waste water, the variable K represents the number of water exchanges, the variable $C_4$ represents the cost per minute of machine utilization, and the variable v represents a temperature rise rate from the indoor temperature $T_L$ to the starting temperature A of the dominant dyeing process (i.e., the first interval of the temperature rise process of the fabric dyeing process) and from the endpoint temperature C of the dominant dyeing process to the maximum temperature $T_H$ (i.e., the third interval of the temperature rise process of the fabric dyeing process). In Equation (4), $C_1 SM$ ($T_H-T_L$)E represents the power consumption cost, ($C_2+C_3$)MKE represents the water consumption cost, and $$C_4\left(\frac{(T_H - T_L)}{v} + \frac{(C-A)\cdot(v-B)}{B \cdot v} + D\right)$$

represents the machine utilization cost.

The processor 113 may select one of the dyeing target-related models according to an instruction of the user (i.e., an instruction received from the user via a transceiving interface of the control data decision apparatus 11) and calculate the target control data set 12 that minimizes the dyeing target-related model according to a corresponding condition set. It is noted that the control condition set comprises a predetermined range of the first dyeing quality-related model and a predetermined range of each of the control factors.

It is assumed that the user selects the first dyeing target-related model (i.e., Equation (2)). The corresponding control condition set may comprise the following Equations (5) to (10):

$$LB_A \leq A \leq C \quad (5)$$

$$LB_B \leq B \leq UB_B \quad (6)$$

$$LB_C \leq C \leq UB_C \quad (7)$$

$$LB_D \leq D \leq UB_D \quad (8)$$

$$LB_E \leq E \leq UB_E \quad (9)$$

$$LB_{k/s} \leq f_{k/s}(A,B,C,D,E) \leq UB_{k/s} \quad (10)$$

The variables $LB_A$, $LB_B$, $UB_B$, $LB_C$, $UB_C$, $LB_D$, $UB_D$, $LB_E$, $UB_E$, $LB_{K/S}$, $UB_{K/S}$ in Equations (5) to (10) may be predetermined values or may be set by the user depending on actual needs (e.g., by receiving a setting inputted from a user via a transceiving interface of the control data decision apparatus 11). Equations (5) to (9) represent the predetermined ranges of the control factors A, B, C, D, E respectively, while Equation (10) shows the predetermined range of the first dyeing quality-related model. Based on the control condition set, the processor 113 calculates the control data of the control factors A, B, C, D, E that meet all the requirements of the control condition set and that minimize the first dyeing target-related model (i.e., Equation (2)) as the target control data set 12.

Herein, it is assumed that the second dyeing target-related model (i.e., Equation (3)) is selected by the user. The corresponding control condition set may further comprise the following Equation (11) in addition to Equations (5) to (10):

$$f_{\Delta E}(A,B,C,D,E) \leq UB_{\Delta E} \quad (11)$$

The variable $UB_{\Delta E}$ in Equation (11) may be a predetermined value or may be set by the user depending on actual needs (e.g., by receiving a setting input from a user via a transceiving interface of the control data decision apparatus 11). Equation (11) is a predetermined range of the second dyeing quality-related model. Based on the control condition set, the processor 113 calculates the control data of the control factors A, B, C, D, E that meet all requirements of the control condition set and that minimize the second dyeing target-related model (i.e., Equation (3)) as the target control data set 12.

Herein, it is assumed that the third dyeing target-related model (i.e., Equation (4)) is selected by the user. The corresponding control condition set may comprise Equations (5) to (11). Similarly, based on the control condition set, the processor 113 calculates the control data of the control factors A, B, C, D, E that meet all requirements of the control condition set and that minimize the third dyeing target-related model (i.e., Equation (4)) as the target control data set 12.

No matter which dyeing target-related model is adopted, the control data comprised in the target control data set 12 calculated by the processor 113 are the data to be obtained. The control data decision apparatus 11 may transmit the control data comprised in the target control data set 12 to the user (e.g., transmit the control data to the user via a transceiving interface of the control data decision apparatus 11) or display the control data on a display device (which may be comprised in the control data decision apparatus 11 or be external to the control data decision apparatus 11). Afterwards, the user may utilize these control data comprised in the target control data set 12 for actual operations in the dyeing vat in the factory and calculate one or more dyeing quality data (e.g., dyeing quality data corresponding to the dyeing quality standard K/S and dyeing quality data corresponding to the dyeing quality standard ΔE) of this dyeing result.

In some embodiments, the processor 113 may store the control data comprised in the target control data set 12 and the corresponding dyeing quality data (i.e., dyeing quality data of the dyeing result obtained by utilizing the target control data set 12 for dyeing) into the storage 111. In some embodiments, the processor 113 may further update the first coefficients of the first dyeing quality-related model and/or the second coefficients of the second dyeing quality-related model according to the historical control data sets 10a, 10b, 10c, the target control data set 12, and at least one dyeing quality datum corresponding to the target control data set 12. Based on the aforementioned descriptions, a person of ordinary skill in the art should know how the processor 113 updates the first coefficients of the first dyeing quality-related model and/or the second coefficients of the second dyeing quality-related model according to the historical control data sets 10a, 10b, 10c, the target control data set 12, and at least one dyeing quality datum corresponding to the target control data set 12. Hence, the details will not be repeated herein. By updating the first coefficients of the first dyeing quality-related model and/or the second coefficients of the second dyeing quality-related model, the processor 113 is able to calculate other target control data sets more accurately.

According to the above descriptions, the control data decision apparatus 11 decides at least one dyeing quality-related model according to a plurality of historical control data sets 10a, 10b, 10c and then calculates a target control data set that minimizes a dyeing target-related model according to a control condition set. Both the at least one dyeing quality-related model and the dyeing target-related model that are used by the control data decision apparatus 11 in deciding the target control data set are related to a plurality of control factors of a fabric dyeing process. Since the control factors that affect the fabric dyeing process are taken into consideration and the historical control data sets 10a, 10b, 10c are utilized, the target control data of the fabric dyeing process can be efficiently calculated by the control data decision apparatus 11 and the cost waste that is caused when a manufacturer decides the target control data set by experience can be avoided.

Figure 2:
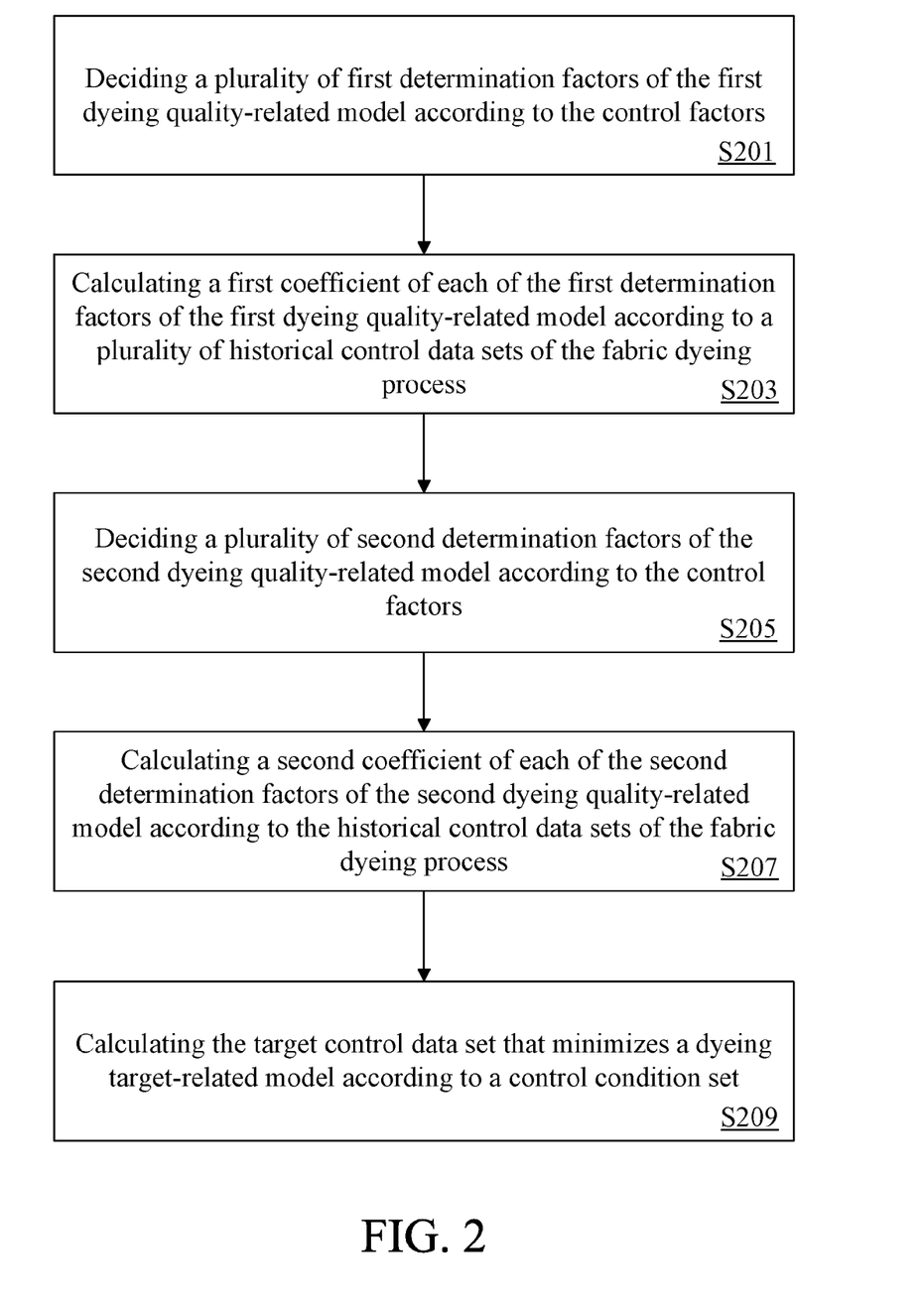
FIG. 2 illustrates the flowchart of the method for deciding control data of the second embodiment.

A second embodiment of the present invention is a method for deciding a target control data set of a fabric dyeing process (hereinafter referred to as "control data decision method") and a flowchart of which is depicted in FIG. 2. The control data decision method is adapted for an electronic computing apparatus, e.g., the control data decision apparatus 11 described in the first embodiment. The fabric dyeing process is affected by a plurality of control factors. It is noted that the target control data set to be decided in this embodiment comprises a plurality of control data corresponding to the control factors one-on-one.

First, a first dyeing quality-related model of the fabric dyeing process is decided by the electronic computing apparatus. Specifically, in step S201, the electronic computing apparatus decides a plurality of first determination factors of the first dyeing quality-related model according to the control factors. Next, in step S203, the electronic computing apparatus calculates a first coefficient of each of the first determination factors of the first dyeing quality-related model according to a plurality of historical control data sets of the fabric dyeing process. Each of the historical control data set comprises at least one historical dyeing quality datum and a plurality of historical control data corresponding to the control factors one-on-one. In some embodiments, the step S203 calculates the first coefficients according to a statistical algorithm, a back-propagation neural network (BPN) algorithm, or a support vector regression algorithm. The statistical algorithm comprises a multiple linear regression algorithm and a plurality of relative weights. It shall be appreciated that the first dyeing quality-related model may be related to a color fastness standard or a dyeing quality standard in some embodiments.

Then, a second dyeing quality-related model of the fabric dyeing process is decided by the electronic computing apparatus. Specifically, in step S205, the electronic computing apparatus decides a plurality of second determination factors of the second dyeing quality-related model according to the control factors. Next, in step S207, the electronic computing apparatus calculates a second coefficient of each of the second determination factors of the second dyeing quality-related model according to the historical control data sets of the fabric dyeing process. In some embodiments, the step S207 may calculate the second coefficients according to a statistical algorithm, a back-propagation neural network algorithm, or a support vector regression algorithm. The statistical algorithm comprises a multiple linear regression algorithm and a plurality of relative weights. It shall be appreciated that the second dyeing quality-related model may be related to a color fastness standard or a dyeing quality standard in some embodiments.

It shall be appreciated that the steps S205 and S207 may be omitted in some embodiments. In some embodiments, the control data decision method may repeat the steps S201 and S203 (or the steps S205 and S207) to decide other dyeing quality-related models of the fabric dyeing process. Based on the aforementioned descriptions, a person of ordinary skill in the art should know how to decide other dyeing quality-related models of the fabric dyeing process. Hence, the details are not repeated herein.

Afterwards, in step S209, the electronic computing apparatus calculates the target control data set that minimizes a dyeing target-related model according to a control condition set. The dying target-related model is defined by the control factors. The control condition set comprises a predetermined range of the first dyeing quality-related model and a predetermined range of each of the control factors. It shall be appreciated that the control condition set may further comprise a predetermined range of the second dyeing quality-related model in some embodiments. Further, the dyeing target-related model may be related to a dyeing quality standard, a dyeing stability, and/or a dyeing cost in some embodiments. Moreover, the step S209 may take the second dyeing quality-related model as the dyeing target-related model in some embodiments.

In some embodiments, an additional step (not shown) may be executed by the control data decision method for updating the first coefficients of the first dyeing quality-related model and/or the second coefficients of the second dyeing quality-related model according to the historical control data sets, the target control data set, and a dyeing quality datum (i.e., a dyeing quality datum of the dyeing result obtained by dyeing according to the target control data set) corresponding to the target control data set. Updating the first coefficients of the first dyeing quality-related model and/or the second coefficients of the second dyeing quality-related model makes the control data decision method calculate other target control data sets more accurately.

In addition to the aforesaid steps, the second embodiment can also execute all the operations and steps of and have the same effects as the control data decision apparatus 11 set forth in the first embodiment. How the second embodiment executes these operations and steps and deliver the same effects will be readily appreciated by those of ordinary skill in the art based on the explanation of the first embodiment and, thus, will not be further described herein.

The control data decision method of the second embodiment may be implemented by a computer program having a plurality of codes. The computer program may be stored in a non-transitory computer readable storage medium. After the codes of the computer program are loaded into an electronic computing apparatus (e.g., the control data decision apparatus 11), the control data decision method described in the second embodiment will be executed. The non-transitory computer-readable medium may be an electronic product, such as a read only memory (ROM), a flash memory, a floppy disk, a hard disk, a compact disk (CD), a mobile disk, a magnetic tape, a database accessible to networks, or any other storage media with the same function and well known to those skilled in the art.

It shall be appreciated that, in the specification and the claims of the present invention, the terms "first" and "second" used in the first dyeing quality-related model and the second dyeing quality-related model are only intended to indicate that these dyeing quality-related models are different from each other. Similarly, the terms "first" and "second" used in the first determination factor and the second determination factor are only intended to indicate that these determination factors correspond to different dyeing quality-related models. Likewise, the terms "first" and "second" used in the first coefficient and the second coefficient are only intended to indicate that these coefficients correspond to different dyeing quality-related models.

According to the above descriptions, the control data decision apparatus, the control data decision method, and the non-transitory computer readable medium thereof according to the present invention decide at least one dyeing quality-related model according to a plurality of historical control data sets and then calculate a target control data set that satisfies a control condition set and that minimizes a dyeing target-related model. Both the at least one dyeing quality-related model and the dyeing target-related model used in deciding the target control data set are related to a plurality of control factors of a fabric dyeing process. Since the control factors that affect the fabric dyeing process are taken into consideration and the historical control data sets are utilized, the present invention can efficiently calculate the target control data of the fabric dyeing process and avoid the cost waste that is caused when the manufacturer decides the target control data set by experience.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for deciding a target control data set of a fabric dyeing process, the target control data set comprising a plurality of control data corresponding to a plurality of control factors one-on-one, the apparatus comprising:

a storage, being stored with a plurality of historical control data sets, each of the historical control data sets comprising a historical dyeing quality datum and a plurality of historical control data corresponding to the control factors one-on-one; and a processor, being electrically connected to the storage and configured to decide a first dyeing quality-related model of the fabric dyeing process, wherein the processor executes the following operations to decide the first dyeing quality-related model: (a1) deciding a plurality of first determination factors of the first dyeing quality-related model according to the control factors and (a2) calculating a first coefficient of each of the first determination factors of the first dyeing quality-related model according to the historical control data sets of the fabric dyeing process, wherein the processor is further configured to calculate the target control data set that minimizes a dyeing target-related model according to a control condition set, the dying target-related model is defined by the control factors, and the control condition set comprises a predetermined range of the dyeing quality-related model and a predetermined range of each of the control factors.

2. The apparatus according to claim 1, wherein the processor further decides a second dyeing quality-related model of the fabric dyeing process, wherein the processor executes the following operations to decide the second dyeing quality-related model: (b1) deciding a plurality of second determination factors of the second dyeing quality-related model according to the control factors and (b2) calculating a second coefficient of each of the determination factors of the second dyeing quality-related model according to the historical control data sets.

3. The apparatus according to claim 2, wherein the processor takes the second dyeing quality-related model as the dyeing target-related model.

4. The apparatus according to claim 2, wherein the control condition set further comprises a predetermined range of the second dyeing quality-related model.

5. The apparatus according to claim 1, wherein the processor further updates the first coefficients of the first dyeing quality-related model according to the historical control data sets, the target control data set, and a dyeing quality datum corresponding to the target control data set.

6. The apparatus according to claim 1, wherein the processor calculates the first coefficients according to one of a statistical algorithm, a back-propagation neural network algorithm, and a support vector regression algorithm.

7. The apparatus according to claim 6, wherein the statistical algorithm comprises a multiple linear regression algorithm and a plurality of relative weights.

8. The apparatus according to claim 1, wherein the first dyeing quality-related model is related to one of a color fastness standard and a dyeing quality standard.

9. The apparatus according to claim 1, wherein the dyeing target-related model is related to one of a dyeing quality standard, a dyeing stability, a dyeing cost, and a combination thereof.

10. A method for deciding a target control data set of a fabric dyeing process, the method being adapted for an electronic computing apparatus, the target control data set comprising a plurality of control data corresponding to a plurality of control factors one-on-one, and the method comprising:

(a) deciding a first dyeing quality-related model of the fabric dyeing process, comprising the following steps of:
(a1) deciding a plurality of first determination factors of the first dyeing quality-related model according to the control factors; and
(a2) calculating a first coefficient of each of the first determination factors of the first dyeing quality-related model according to a plurality of historical control data sets of the fabric dyeing process, wherein each of the historical control data sets comprises a historical dyeing quality datum and a plurality of historical control data corresponding to the control factors one-on-one; and (b) calculating the target control data set that minimizes a dyeing target-related model according to a control condition set, wherein the dying target-related model is defined by the control factors and the control condition set comprises a predetermined range of the dyeing quality-related model and a predetermined range of each of the control factors.

11. The method according to claim 10, further comprising:
(c) deciding a second dyeing quality-related model of the fabric dyeing process, comprising the following steps of:
(c1) deciding a plurality of second determination factors of the second dyeing quality-related model according to the control factors; and
(c2) calculating a second coefficient of each of the determination factors of the second dyeing quality-related model according to the historical control data sets.

12. The method according to claim 11, wherein the step (b) takes the second dyeing quality-related model as the dyeing target-related model.

13. The method according to claim 11, wherein the control condition set further comprises a predetermined range of the second dyeing quality-related model.

14. The method according to claim 10, further comprising:
updating the first coefficients of the first dyeing quality-related model according to the historical control data sets, the target control data set, and a dyeing quality datum corresponding to the target control data set.

15. The method according to claim 10, wherein the step (a2) calculates the first coefficients according to one of a statistical algorithm, a back-propagation neural network algorithm, and a support vector regression algorithm.

16. The method according to claim 15, wherein the statistical algorithm comprises a multiple linear regression algorithm and a plurality of relative weights.

17. The method according to claim 10, wherein the first dyeing quality-related model is related to one of a color fastness standard and a dyeing quality standard.

18. The method according to claim 10, wherein the dyeing target-related model is related to one of a dyeing quality standard, a dyeing stability, a dyeing cost, and a combination thereof.

19. A non-transitory computer readable medium, having a computer program stored therein, the computer program executing a method for deciding a target control data set of a fabric dyeing process after being loaded into an electronic computing apparatus, the target control data set comprising a plurality of control data corresponding to a plurality of control factors one-on-one, and the method comprising:

(a) deciding a first dyeing quality-related model of the fabric dyeing process, comprising the following steps of:
  (a1) deciding a plurality of first determination factors of the first dyeing quality-related model according to the control factors; and
  (a2) calculating a first coefficient of each of the first determination factors of the first dyeing quality-related model according to a plurality of historical control data sets of the fabric dyeing process, wherein each of the historical control data sets comprises a historical dyeing quality datum and a plurality of historical control data corresponding to the control factors one-on-one; and
(b) calculating the target control data set that minimizes a dyeing target-related model according to a control condition set, wherein the dying target-related model is defined by the control factors and the control condition set comprises a predetermined range of the dyeing quality-related model and a predetermined range of each of the control factors.

20. The non-transitory computer readable medium according to claim 19, further comprising:
(c) deciding a second dyeing quality-related model of the fabric dyeing process, comprising:
  (c1) deciding a plurality of second determination factors of the second dyeing quality-related model according to the control factors; and
  (c2) calculating a second coefficient of each of the determination factors of the second dyeing quality-related model according to the historical control data sets.

* * * * *